(12) United States Patent
Ran et al.

(10) Patent No.: US 12,539,885 B2
(45) Date of Patent: *Feb. 3, 2026

(54) AUTONOMOUS VEHICLE CONTROL SYSTEM FOR CRITICAL POINTS WITH PARTIALLY INSTRUMENTED INFRASTRUCTURE AND CLOUD SERVICE

(71) Applicant: CAVH LLC, Fitchburg, WI (US)

(72) Inventors: Bin Ran, Fitchburg, WI (US); Peipei Mao, Fitchburg, WI (US); Linheng Li, Fitchburg, WI (US); Yang Cheng, Middleton, WI (US); Tianyi Chen, Madison, WI (US); Yang Zhou, Madison, WI (US); Zhen Zhang, Madison, WI (US); Xiaotian Li, Madison, WI (US); Shen Li, Madison, WI (US); Shuoxuan Dong, Madison, WI (US); Kunsong Shi, Madison, WI (US)

(73) Assignee: CAVH LLC, Fitchburg, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/628,915

(22) Filed: Apr. 8, 2024

(65) Prior Publication Data

US 2024/0343269 A1 Oct. 17, 2024

Related U.S. Application Data

(63) Continuation of application No. 17/878,982, filed on Aug. 2, 2022, now Pat. No. 11,964,674, which is a
(Continued)

(51) Int. Cl.
*B60W 60/00* (2020.01)
*G08G 1/01* (2006.01)
(Continued)

(52) U.S. Cl.
CPC .. *B60W 60/00184* (2020.02); *B60W 60/0011* (2020.02); *G08G 1/0112* (2013.01);
(Continued)

(58) Field of Classification Search
CPC ....... B60W 60/00184; B60W 60/0011; B60W 60/00; G06Q 10/0633; G06Q 10/06313;
(Continued)

(56) References Cited

U.S. PATENT DOCUMENTS 10,380,886 B2 * 8/2019 Ran ....................... G08G 1/0129
10,597,895 B1 * 3/2020 Daniels .................. A01G 17/02
(Continued)

FOREIGN PATENT DOCUMENTS

JP 3559425 9/2004
JP 3559425 B2 * 9/2004 ............. B60K 41/00
(Continued)

OTHER PUBLICATIONS

Society of Automotive Engineers International's new standard J3016: "Taxonomy and Definitions for Terms Related to On-Road Motor Vehicle Automated Driving Systems" 2014, downloaded Sep. 17, 2019, 12 pages.

*Primary Examiner* — Yuri Kan
(74) *Attorney, Agent, or Firm* — Casimir Jones, SC; Thomas A. Isenbarger

(57) ABSTRACT

This technology relates to autonomous vehicle (AV) control systems tailored for critical points of a partially instrumented infrastructure. The first system integrates an onboard unit (OBU) and communication modules to interact with roadside units (RSUs) or a cloud platform, delivering time-sensitive control instructions to vehicles at critical points. The OBUs execute these instructions for driving tasks. The second system combines an OBU with a cloud platform, leveraging cloud services for enhanced functionality like
(Continued)

storage and computing. It adapts to diverse critical point scenarios, employing proactive incident prediction and rapid detection methods for optimized performance.

20 Claims, 7 Drawing Sheets

Related U.S. Application Data continuation of application No. 16/751,487, filed on Jan. 24, 2020, now Pat. No. 11,447,152.

(60) Provisional application No. 62/796,618, filed on Jan. 25, 2019.

(51) Int. Cl.
 *H04W 4/44* (2018.01)
 *H04W 4/46* (2018.01)
(52) U.S. Cl.
 CPC ......... *G08G 1/0116* (2013.01); *G08G 1/0125* (2013.01); *H04W 4/44* (2018.02); *H04W 4/46* (2018.02)
(58) Field of Classification Search
 CPC ............ G06Q 10/06311; H04B 7/1858; A01G 17/02; B60R 21/00; G06K 9/00805; G06K 13/0825; H04W 4/40; G08G 1/0145; G08G 1/167; G08G 1/0129; G08G 1/015; B60K 31/0008; B60K 41/00; H04L 67/00
 See application file for complete search history.

(56) References Cited

U.S. PATENT DOCUMENTS

| | | | |
|---|---|---|---|
| 10,692,365 B2* | 6/2020 | Ran | G08G 1/0145 |
| 10,867,512 B2* | 12/2020 | Ran | G08G 1/167 |
| 11,447,152 B2* | 9/2022 | Ran | G08G 1/0145 |
| 2003/0203717 A1* | 10/2003 | Chuprun | G06K 13/0825 |
| | | | 455/12.1 |
| 2019/0206255 A1* | 7/2019 | Tao | H04W 4/40 |
| 2019/0244518 A1 | 8/2019 | Cheng et al. | |
| 2019/0244521 A1 | 8/2019 | Ran et al. | |
| 2019/0258251 A1* | 8/2019 | Ditty | G06K 9/00805 |
| 2019/0311616 A1 | 10/2019 | Jin et al. | |
| 2019/0347931 A1 | 11/2019 | Ding et al. | |
| 2020/0005633 A1 | 1/2020 | Jin et al. | |
| 2020/0005644 A1* | 1/2020 | Ichimaru | B60R 21/00 |
| 2020/0119811 A1* | 4/2020 | Kay | H04B 7/1858 |
| 2020/0174455 A1* | 6/2020 | Fox | G06Q 10/06311 |
| 2020/0175443 A1* | 6/2020 | Fox | G06Q 10/0633 |
| 2020/0175444 A1* | 6/2020 | Fox | G06Q 10/06313 |

FOREIGN PATENT DOCUMENTS

| | | | | |
|---|---|---|---|---|
| WO | WO 2005/037592 | | 4/2005 | |
| WO | WO-2005037592 A1 * | | 4/2005 | ......... B60K 31/0008 |

* cited by examiner

AUTONOMOUS VEHICLE CONTROL SYSTEM FOR CRITICAL POINTS WITH PARTIALLY INSTRUMENTED INFRASTRUCTURE AND CLOUD SERVICE

CROSS-REFERENCE TO RELATED APPLICATIONS

This application is a continuation of U.S. patent application Ser. No. 17/878,982, filed Aug. 2, 2022, now U.S. Pat. No. 11,964,674, issued Apr. 23, 2024, which is a continuation of U.S. patent application Ser. No. 16/751,487, filed Jan. 24, 2020, now U.S. Pat. No. 11,447,152, issued Aug. 31, 2022, which claims the benefit of U.S. Provisional Patent Application No. 62/796,618, filed Jan. 25, 2019, each of which is incorporated herein by reference in its entirety.

FIELD

The present technology relates to systems and methods for a heterogeneous connected automated vehicle highway (CAVH) network comprising various roadside unit (RSU) and traffic control unit/traffic control center (TCU/TCC) network coverages and functionalities for vehicles of various automation levels and other road users. The systems and methods provide various levels of coordinated control among CAVH system entities, providing individual road users with detailed customized information, and time-sensitive control instructions and operations and maintenance services.

BACKGROUND

Autonomous vehicles (e.g., vehicles that sense their environment and navigate without human input or with reduced human input) are in development. At present, autonomous vehicles are in experimental testing and are not in widespread commercial use. Existing autonomous vehicle technologies require expensive and complicated onboard systems, which has substantially hindered the widespread implementation and use of autonomous vehicles.

SUMMARY

In some embodiments, the present technology relates to connected automated vehicle highway (CAVH) systems that coordinate vehicle movements by communication of information and control commands among vehicle subsystems and infrastructure subsystems. For instance, U.S. patent application Ser. No. 15/628,331, which is incorporated herein by reference, describes a system-oriented and fully-controlled CAVH system that provides various levels of connected and automated vehicles and highways. An additional technology described in U.S. patent application Ser. No. 16/135,916, which is incorporated herein by reference, provides systems and methods for an Intelligent Road Infrastructure System (IRIS), which provides vehicle operations and control for CAVH systems. While these technologies provide an autonomous driving vehicle system based on fully instrumented CAVH roads, embodiments of the present technology relate to CAVH systems comprising autonomous and non-autonomous vehicles and/or comprising roads and portions of roads for which various CAVH components and systems are partially implemented. Thus, the technology described herein provides a range of levels of coordinated vehicle control for roads, e.g., embodiments provide systems comprising roads with lower coverage and/or implementation of CAVH systems and components that interface with roads with higher or full coverage and/or implementation of CAVH systems and components. Embodiments provide systems and methods for monitoring the movement of vehicles among partially implemented CAVH portions of road systems and fully implemented CAVH portions of road systems and for controlling the movement of vehicles among partially implemented CAVH portions of road systems and fully implemented CAVH portions of road systems.

In some embodiments, the technology provides a CAVH system comprising components and/or methods as described in U.S. patent application Ser. No. 15/628,331, which is herein incorporated by reference. For example, in some embodiments, the technology provides a vehicle operations and control system for a connected automated vehicle highway (CAVH) network. In some embodiments, the system comprises an intelligent road infrastructure system (IRIS) comprising a roadside unit (RSU) network and a Traffic Control Unit (TCU) and Traffic Control Center (TCC) network, wherein the CAVH network comprises various degrees of RSU coverage and functionality and/or various degrees of TCU/TCC coverage and functionality; and wherein the CAVH network is configured to provide various levels of coordinated control among system entities, provides road users with detailed customized information and time-sensitive control instructions, and operations and maintenance services. In some embodiments, the system further comprises one or more of vehicle onboard units (OBU) and vehicle interfaces; traffic operations centers (TOC); and/or a cloud-based platform configured to provide information and computing services. In some embodiments, the system is configured to manage mixed traffic of vehicles having various automation levels, non-automated vehicles, and other road users.

In some embodiments, the system is configured to provide sensing functions, transportation behavior prediction and management functions, planning and decision-making functions, and vehicle control functions.

In some embodiments, the CAVH network comprises a partially instrumented portion and/or a non-instrumented portion. In some embodiments, the CAVH network further comprises a fully instrumented portion.

In some embodiments, the technology provides a partially instrumented RSU providing one or more, two or more, or three or more of the following: communications functions, environment sensing functions, traffic behavior prediction functions, or vehicle control functions. In some embodiments, systems comprise a partially instrumented RSU providing one or more, two or more, or three or more of the following: communications functions, environment sensing functions, traffic behavior prediction functions, or vehicle control functions. In some embodiments, the technology provides a fully instrumented RSU providing communications functions, environment sensing functions, traffic behavior prediction functions, and vehicle control functions. In some embodiments, systems comprise a fully instrumented RSU providing communications functions, environment sensing functions, traffic behavior prediction functions, and vehicle control functions. In some embodiments, the system as described herein comprise a partially instrumented RSU and the system is configured to sense the traffic environment for an area comprising said partially instrumented RSU using data from the partially instrumented RSU and data from other system components communicated using cloud and infrastructure communication.

In some embodiments, the system is configured to sense and communicate traffic environment data for an area, said traffic environment data describing vehicles; pedestrians; road geometry, road design information, and road pavement conditions; traffic control infrastructure; traffic control devices; and/or animals. In some embodiments, the traffic control infrastructure comprises safety barriers and/or road markings. In some embodiments, the traffic control devices comprise traffic signs and/or traffic signals.

In some embodiments, the system comprises transportation behavior prediction and management functions that are configured to predict individual human-driven vehicular trajectory; vehicle platoon and/or mixed platoon trajectory; vehicular route choice; traffic flow over transportation segment; pedestrian behavior; general traffic environment; vehicle traffic composition; and/or vehicle and infrastructure communication connection. In some embodiments, transportation behavior prediction and management functions are configured to predict based on information collected by and/or communicated from a partially instrumented RSU, vehicle to vehicle communication, and/or the cloud. In some embodiments, general traffic environment comprises data describing weather, traffic conditions, traffic hazards, time, and/or location.

In some embodiments, the system integrates real-time sensor data, interpolated data, and predicted transportation behavior to provide partial or full CAVH functionality.

In some embodiments, the systems described herein comprise planning and decision-making functions that are configured to plan and/or decide vehicle and/or platoon trajectory; vehicle and/or platoon route choice; variable speed limit; ramp metering; vehicle use of on-ramp and/or off-ramp; and/or traffic signal timing. In some embodiments, the planning and decision-making functions are configured to plan and/or decide based on information collected by and/or communicated from a partially instrumented RSU. In some embodiments, a TCC/TCU processes information from a partially instrumented RSU, executes a planning and decision-making function to plan and/or decide vehicle and/or platoon trajectory; vehicle and/or platoon route choice; variable speed limit; ramp metering; vehicle use of on-ramp and/or off-ramp; and/or traffic signal timing, and to communicate instructions to a TCU and/or a vehicle.

In some embodiments, the systems provided herein are configured to provide a fully instrumented transportation network. In some embodiments, the systems provided herein are configured to provide a partially instrumented transportation networks. In some embodiments, the systems described herein comprise subsystems that are fully instrumented, partially instrumented, and/or non-instrumented. In some embodiments, a non-instrumented subsystem is configured to communicate with other components (e.g., a non-instrumented subsystem is configured to send and receive information to and from other components).

In some embodiments, the systems described herein are configured to manage traffic and provide vehicle instructions for vehicles in a traffic environment comprising mixed traffic and non-traffic units that are human-driven vehicles, autonomous vehicles, connected vehicles, walking units, non-motor vehicles, connected autonomous vehicles, and obstacles.

In some embodiments, the systems are configured to provide vehicle control functions. In some embodiments, the vehicle control functions are configured to provide control instructions to road infrastructure; humans; vehicles; and/or animals and moving obstacles. In some embodiments, the road infrastructure is a traffic sign, an IRIS component, a traffic signal, or a traffic control device. In some embodiments, the human being is a pedestrian or is a vehicle user.

In some embodiments, the vehicle is an autonomous vehicle, a connected vehicle, a connected autonomous vehicle, a human-driven vehicle, or a non-motor vehicle. In some embodiments, the vehicle control functions comprise coordinated control strategies comprising full control strategies, partial control strategies, and/or non-control strategies. In some embodiments, a non-control strategy includes communication of information among components of the system (e.g., information is communicated).

In some embodiments, the vehicle control functions are configured to receive information describing the CAVH configuration and sensor information. In some embodiments, the information describing the CAVH configuration comprises information describing RSU location and/or RSU function. In some embodiments, the sensor information comprises sensed static object information from an RSU and/or sensed dynamic object information. In some embodiments, the sensor information comprises real-time traffic information and/or accident or special event information. In some embodiments, the information describing the CAVH configuration comprises control levels. In some embodiments, the vehicle control functions are configured to receive information comprising decision maker instructions and/or recommendations. In some embodiments, the vehicle control functions are configured to receive information from an RSU, the TCC/TCU, and/or cloud. In some embodiments, the vehicle control functions provide macroscopic control of traffic flow or density on road segments or road networks. In some embodiments, the macroscopic control of vehicles comprises determining vehicle route. In some embodiments, the vehicle control functions provide mesoscopic control of vehicle platooning. In some embodiments, the vehicle control functions provide microscopic control of an individual vehicle. In some embodiments, microscopic control of individual vehicle comprises longitudinal control and lateral control of a vehicle. In some embodiments, longitudinal control comprises control of vehicle following and/or collision avoidance. In some embodiments, lateral control comprises control of vehicle merging, lane changing, diverging, and/or turning.

In some embodiments, the systems described herein comprise one or more critical points. In some embodiments, a critical point is a static critical point or a dynamic critical point. In some embodiments, a critical point is identified as a region or point of a road having a high historical crash frequency, traffic control signage, a traffic control sign, traffic congestion, a critical road geometry (e.g., a curve, hill, blind spot, merge point, on ramp, off ramp, toll collection point (e.g., toll booth, toll plaza), or traffic circle), a traffic oscillation, and/or a real-time traffic incident (e.g., an ongoing traffic accident). In some embodiments, a critical point is instrumented with one or more IRIS components to provide partial or full control of the critical point. In some embodiments, critical points are identified as regions or points of roads that have high priority for traffic control and management.

In some embodiments, systems further comprise safety infrastructure and software to minimize and/or eliminate crash frequency and severity. In some embodiments, the safety infrastructure and software comprises proactive methods based on incident prediction and risk index estimation that are used before a traffic incident occurs; active methods based on rapid incident detection that are used to identify imminent incidents and are deployed before harms occur; and/or passive methods to alleviate harms and losses after an incident occurs.

In some embodiments, the systems provided herein are a partially instrumented CAVH system. In some embodiments, a partially instrumented CAVH system comprises IRIS components of varying functionality. In some embodiments, a partially instrumented CAVH system comprises IRIS components of varying hardware and/or software configurations. In some embodiments, a system comprises a fully instrumented RSU providing communications functions, environment sensing functions, traffic behavior prediction functions, and vehicle control functions. In some embodiments, a system comprises a partially instrumented RSU providing communications functions. In some embodiments, a system comprises a partially instrumented RSU providing environment sensing functions. In some embodiments, a system comprises a partially instrumented RSU providing traffic behavior prediction functions. In some embodiments, a system comprises a partially instrumented RSU providing vehicle control functions. In some embodiments, a system comprises a RSU providing two of the following: communications functions, environment sensing functions, traffic behavior prediction functions, and vehicle control functions. In some embodiments, a system comprises a RSU providing three of the following: communications functions, environment sensing functions, traffic behavior prediction functions, and vehicle control functions. In some embodiments, the system comprises a TCC/TCU configured to make decisions, globally optimize traffic, and/or control traffic. In some embodiments, the system comprises a TCC/TCU configured to make decisions. In some embodiments, the system comprises a TCC/TCU configured to globally optimize traffic. In some embodiments, the system comprises a TCC/TCU configured to control traffic. In some embodiments, the system comprises a TCC/TCU configured to perform any two of: make decisions, globally optimize traffic, and/or control traffic.

In some embodiments, the system is configured to synchronize data in time or space. In some embodiments, the system is configured to synchronize timestamps and align locations of data within and between sensors. In some embodiments, the system is configured to synchronize data from computing and communication modules in time and space. In some embodiments, the system is configured to coordinate control commands sent to vehicles through OBU communication.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

For instance, in some embodiments, the technology provides a method for coordinating vehicle movements comprising providing a connected automated vehicle highway (CAVH) network comprising heterogeneous degrees of RSU coverage and functionality and/or heterogeneous degrees of TCU/TCC coverage and functionality; and providing levels of coordinated control among system entities, providing road users with customized information and time-sensitive control instructions, and providing operations and maintenance services. In some embodiments, the methods further comprise providing one or more of: vehicle onboard units (OBU) and vehicle interfaces; traffic operations centers (TOC); and/or a cloud-based platform configured to provide information and computing services. In some embodiments, methods comprise managing mixed traffic of vehicles having heterogeneous automation levels, non-automated vehicles, and other road users. In some embodiments, methods further comprise sensing the environment, predicting and managing transportation behavior, planning and making decisions, and controlling vehicles.

In some embodiments, the methods find use to manage traffic in a CAVH network comprising a partially instrumented portion and/or a non-instrumented portion. In some embodiments, the methods find use to manage traffic in a CAVH network further comprising a fully instrumented portion. In some embodiments, the CAVH network comprises a partially instrumented portion and said method comprises communicating, environment sensing, predicting traffic behavior, or controlling vehicles. In some embodiments, methods comprise sensing the traffic environment for said partially instrumented portion; and using data from the partially instrumented portion and data from other system components communicated using cloud and infrastructure communication. In some embodiments, methods comprise sensing and communicating traffic environment data for an area, said traffic environment data describing vehicles; pedestrians; road geometry, road design information, and road pavement conditions; traffic control infrastructure; traffic control devices; and/or animals. In some embodiments, traffic control infrastructure comprises safety barriers and/or road markings. In some embodiments, traffic control devices comprise traffic signs and/or traffic signals.

In some embodiments, methods comprising predicting and managing transportation behavior comprise predicting, e.g., individual human-driven vehicular trajectory; mixed platoon trajectory; vehicular route choice; traffic flow over transportation segment; pedestrian behavior; general traffic environment; vehicle traffic composition; and/or vehicle and infrastructure communication connection. In some embodiments, predicting and managing transportation behavior comprises predicting based on information collected by and/or communicated from a partially instrumented RSU, vehicle to vehicle communication, and/or the cloud. In some embodiments, general traffic environment comprises data describing weather, traffic conditions, traffic hazards, time, and/or location. In some embodiments, methods comprise integrating real-time sensor data, interpolated data, and predicted transportation behavior to provide partial or full CAVH functionality.

In some embodiments, methods comprising planning and making decisions comprise planning and/or deciding, e.g., vehicle and/or platoon trajectory; vehicle and/or platoon route choice; variable speed limit; ramp metering; vehicle use of on-ramp and/or off-ramp; and/or traffic signal timing. In some embodiments, planning and making decisions comprises collecting information by a partially instrumented RSU and/or communicating information to or from a partially instrumented RSU.

In some embodiments, methods comprise processing information from a partially instrumented RSU and deciding, e.g., vehicle and/or platoon trajectory; vehicle and/or platoon route choice; variable speed limit; ramp metering; vehicle use of on-ramp and/or off-ramp; and/or traffic signal timing; and communicating instructions to a TCU and/or a vehicle. In some embodiments, methods comprise providing a fully instrumented transportation network. In some embodiments, methods comprise providing a partially instrumented transportation network. In some embodiments, methods comprise providing a non-instrumented transportation network. In some embodiments, methods comprise managing traffic and providing vehicle instructions for vehicles in a traffic environment comprising mixed traffic and non-traffic units that are human-driven vehicles, autonomous vehicles, connected vehicles, walking units, non-motor vehicles, connected autonomous vehicles, and obstacles. In some embodiments, controlling vehicles comprises providing control instructions to: road infrastructure; humans; vehicles; and/or animals and moving obstacles. In some embodiments, road infrastructure is a traffic sign, an IRIS component, a traffic signal, or a traffic control device.

In some embodiments, a human is a pedestrian or is a vehicle user. In some embodiments, a vehicle is an autonomous vehicle, a connected vehicle, a connected autonomous vehicle, a human-driven vehicle, or a non-motor vehicle. In some embodiments, controlling vehicles comprises providing coordinated control strategies that are full control strategies, partial control strategies, and/or non-control strategies. In some embodiments, controlling vehicles comprises receiving information describing the CAVH configuration and sensor information. In some embodiments, information describing the CAVH configuration comprises information describing RSU location and/or RSU function. In some embodiments, sensor information comprises sensed static object information from an RSU and/or sensed dynamic object information. In some embodiments, sensor information comprises real-time traffic information and/or accident or special event information. In some embodiments, information describing the CAVH configuration comprises control levels. In some embodiments, controlling vehicles comprises receiving information comprising decision maker instructions and/or recommendations. In some embodiments, controlling vehicles comprises receiving information from an RSU, the TCC/TCU, and/or cloud.

In some embodiments, controlling vehicles comprises macroscopically controlling traffic flow or density on road segments or road networks. In some embodiments, macroscopically controlling vehicles comprises determining vehicle route. In some embodiments, controlling vehicles comprises mesoscopically controlling vehicle platooning. In some embodiments, controlling vehicles comprises microscopically controlling individual vehicles. In some embodiments, microscopically controlling individual vehicles comprises longitudinally controlling and laterally controlling a vehicle. In some embodiments, longitudinally controlling a vehicle comprises controlling vehicle following and/or avoiding collisions. In some embodiments, laterally controlling a vehicle comprises controlling vehicle merging, lane changing, diverging, and/or turning.

In some embodiments, methods comprise coordinating vehicle movements at one or more critical points. In some embodiments, a critical point is a static critical point or a dynamic critical point. In some embodiments, a critical point is a static critical point or a dynamic critical point. In some embodiments, a critical point is identified as a region or point of a road having a high historical crash frequency, traffic control signage, a traffic control sign, traffic congestion, a critical road geometry (e.g., a curve, hill, blind spot, merge point, on ramp, off ramp, toll, or traffic circle), a traffic oscillation, and/or a real-time traffic incident (e.g., an ongoing traffic accident). In some embodiments, methods comprises instrumenting a critical point with one or more IRIS components to provide partial or full control of the critical point. In some embodiments, methods comprise identifying critical points as regions or points of roads that have high priority for traffic control and management.

In some embodiments, methods further comprise providing safety infrastructure and software to minimize and/or eliminate crash frequency and severity. In some embodiments, safety infrastructure and software comprises, e.g., proactive methods based on incident prediction and risk index estimation that are used before a traffic incident occurs; active methods based on rapid incident detection that are used to identify imminent incidents and are deployed before harms occur; and/or passive methods to alleviate harms and losses after an incident occurs.

In some embodiments, methods comprise controlling vehicle movements in a partially instrumented CAVH system. In some embodiments, a partially instrumented CAVH system comprises IRIS components of heterogeneous functionality. In some embodiments, a partially instrumented CAVH system comprises IRIS components of heterogeneous hardware and/or software configurations. In some embodiments, methods comprise controlling vehicle movements by a fully instrumented RSU or a partially instrumented RSU. In some embodiments, controlling vehicle movements in a fully instrumented RSU comprises communicating, sensing the environment, predicting traffic behavior, and controlling vehicles. In some embodiments, the communicating is performed by an RSU. In some embodiments, sensing the environment is performed by an RSU. In some embodiments, predicting traffic behavior is performed by an RSU. In some embodiments, controlling vehicles is performed by an RSU. In some embodiments, two of communicating, sensing the environment, predicting traffic behavior, and controlling vehicles is performed by a partially instrumented RSU. In some embodiments, three of communicating, sensing the environment, predicting traffic behavior, and controlling vehicles is performed by a partially instrumented RSU.

In some embodiments, methods comprise making decisions, globally optimizing traffic, and/or controlling traffic by a TCC/TCU. In some embodiments, methods comprise making decisions by a TCC/TCU. In some embodiments, methods comprise globally optimizing traffic by a TCC/TCU. In some embodiments, methods comprise controlling traffic by a TCC/TCU. In some embodiments, methods comprise two of making decisions, globally optimizing traffic, and/or controlling traffic is performed by a TCC/TCU.

Some embodiments of methods comprise synchronizing data in time or space. In some embodiments, methods comprise synchronizing timestamps and aligning locations of data within and between sensors. In some embodiments, methods comprise synchronizing data from computing and communication modules in time and space. In some embodiments, methods comprise coordinating control commands sent to vehicles through OBU communication.

In some embodiments, the technology provides use of a partially instrumented CAVH system to control traffic flow and vehicle movement. In some embodiments, the technology provides use of a system or a method as described herein.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all steps, operations, or processes described.

Embodiments of the technology may also relate to an apparatus for performing the operations described herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

FIG. 1 shows an embodiment of a CAVH system comprising roads that have critical points: e.g., Stop Sign Critical Point 104, which is a location or region identified as having a stop sign, e.g., at a crossing; Traffic Signal Critical Point 105, which is a location or region identified as having a traffic signal, e.g., at a crossing; Traffic Oscillation Critical Point 106, which is a location or region identified as having significant traffic oscillations (e.g., variation in amount of traffic as a function of time); and Traffic Capacity Critical Point 107, which is a location or region identified as having a high average traffic capacity.

DEFINITIONS

Figure 1:
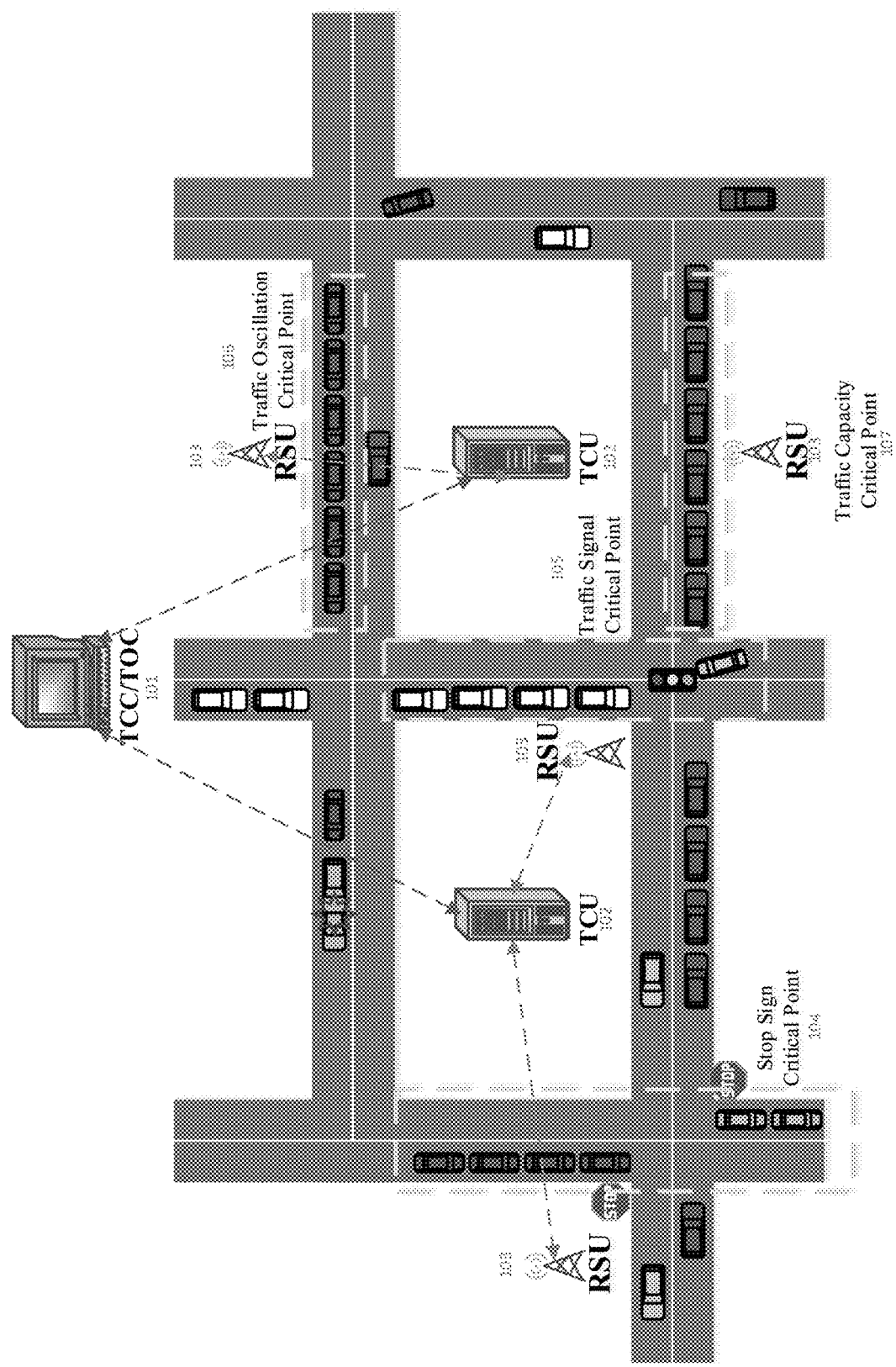
FIG. 1 is a schematic drawing showing an embodiment of a CAVH system comprising CAVH system components and roads comprising critical points. Features of the technology shown in FIG. 1 include, e.g., 101: Traffic Control Center/Traffic Operation Center (TCC/TOC), which collects data from Traffic Control Units (TCUs) 102. Based on the data, the TCC/TOC provides a macroscopic control computation and/or instruction (e.g., route choice) and sends information and/or control instructions to the TCU. The TCU 102 aggregates and integrates information collected by one or more Roadside Units (RSU) 103 and sends the fused data to TCC/TOC. TCU also receives control instructions from TCC/TOC. TCU generates a mesoscopic control strategy (e.g., vehicular platooning) based on the information and/or control instructions received from the TCC/TOC. TCU sends the strategy to RSU. One or more RSU 103 receives data from connected vehicles, detects traffic conditions, and/or sends targeted instructions to vehicles. RSU receives control strategies from TCU and sends instructions to local vehicles based on the strategy.

To facilitate an understanding of the present technology, terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "sensing-free" method does not comprise a sensing step, a "controller-free" system does not comprise a controller, etc.

As used herein, the term "support" when used in reference to one or more components of the CAVH system providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

As used herein, the term "fully instrumented" refers to a CAVH system or a portion of a CAVH system comprising all IRIS system components and all IRIS system functions (e.g., all of: sensing functions, transportation behavior prediction and management functions, planning and decision-making functions, and vehicle control functions).

As used herein, the term "partially instrumented" refers to a CAVH system or a portion of a CAVH system comprising some, but not all, IRIS system components and/or some, but not all, IRIS system functions (e.g., some, but not all of, sensing functions, transportation behavior prediction and management functions, planning and decision-making functions, and vehicle control functions).

As used herein, the term "non-instrumented" refers to a road system or a portion of a road system (e.g., a road system or portion interfacing with a fully instrument and/or a partially instrumented CAVH system or portion of a CAVH system) that comprises no IRIS system components and does not comprise (e.g., is not served by) IRIS system functions. In some embodiments, a "non-instrumented" system provides communications and information exchange.

As used herein, the term "full control" refers to a control function or control strategy of a CAVH system in which all vehicles have automation functions and are configured to receive and implement control orders in a cooperative manner; and in which all infrastructure components (e.g., traffic signal, variable speed limit sign, etc.) are configured to be controlled, if necessary, in a cooperative manner.

As used herein, the term "partial control" refers to a control function or control strategy of a CAVH system in which all or some of the vehicles are configured to receive control orders and implement control orders in a noncooperative and/or cooperative manner; and/or in which all or some of the infrastructure components are configured to be controlled in a noncooperative and/or cooperative manner.

As used herein, the term "non-control" refers to a control function or control strategy of a CAVH system in which none of vehicles are configured to be controlled and in which none of the infrastructure components is configured to be controlled. In some embodiments, a non-control strategy comprises communication and exchange of information.

As used herein, the term "IRIS system component" refers individually and/or collectively to one or more of an OBU, RSU, TCC, TCU, TCC/TCU, TOC, and/or CAVH cloud component.

As used herein, the term "critical point" refers to a portion or region of a road that is identified as appropriate to be provided with a partially implemented CAVH system or a fully implemented CAVH system. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the term "data synchronization" refers to identifying data from one or more sensors that was collected at the same time, substantially same time, and/or effectively the same time ("synchronized in time") or at the same location, substantially the same location, and/or effectively the same location ("synchronized in space").

As used herein, the term "human-driven vehicles" refers to vehicles that are controlled by a human.

As used herein, the term "autonomous vehicle" or "AV" refers to an autonomous vehicle, e.g., at any level of automation (e.g., as defined by SAE International Standard J3016 (2014)).

As used herein, the term "connected vehicle" or "CV" refers to a connected vehicle, e.g., configured for any level of communication (e.g., V2V, V2I, and/or I2V).

As used herein, the term "walking unit" refers to any walking creature, e.g., a human pedestrian or an animal.

As used herein, the term "non-motor vehicle" refers to an animal-powered vehicle, e.g., a bicycle, tricycle, scooter, carriage, cart, rickshaw, skateboard, etc.

As used herein, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

DETAILED DESCRIPTION

In some embodiments, the present technology relates to an intelligent road infrastructure system and, more particularly, to systems and methods for a heterogeneous connected automated vehicle highway (CAVH) network in which the road network has various RSU and TCU/TCC coverages and functionalities. The heterogeneous CAVH network facilitates control and operations for vehicles of various automation level and other road users by implementing various levels of coordinated control among CAVH system entities and providing individual road users with detailed customized information and time-sensitive control instructions, and operations and maintenance services.

In some embodiments, the technology provides a vehicle operations and control system comprising one or more of a roadside unit (RSU) network; a Traffic Control Unit (TCU) and Traffic Control Center (TCC) network (e.g., TCU/TCC network); a vehicle comprising an onboard unit (OBU); and/or a Traffic Operations Center (TOC).

Embodiments provide an RSU network comprising one or more RSUs. In some embodiments, RSUs have a variety of functionalities. For example, embodiments of RSUs comprise one or more components, sensors, and/or modules as described herein in relation to the RSU. In some embodiments, an RSU is a "limited function RSU", which is an RSU comprising fewer components, sensors, and/or modules that a "full function" RSU. Embodiments of the technology provide several types of limited function RSUs and several types of full function RSUs. The technology provides several levels of RSUs, e.g., from low to high comprising fewer or more components, sensors, modules, and/or functionalities. For example, in some embodiments RSUs provide real-time vehicle environment sensing and traffic behavior prediction and send instantaneous control instructions for individual vehicles through OBUs. In some embodiments, RSUs provide real-time vehicle environment sensing and traffic behavior prediction and do not send instantaneous control instructions for individual vehicles through OBUs. In some embodiments, RSUs do not provide real-time vehicle environment sensing and traffic behavior prediction and send instantaneous control instructions for individual vehicles through OBUs. In some embodiments, RSUs provide real-time vehicle environment sensing and do not provide traffic behavior prediction. In some embodiments, RSUs do not provide real-time vehicle environment sensing and provide traffic behavior prediction. In some embodiments, RSUs provide real-time vehicle environment sensing based on a limited number of sensors, modules, and/or functionalities described herein. In some embodiments, RSUs provide real-time vehicle environment sensing based on 1, 2, 3, 4, 5, 6, 7, 8, 9, or 10 sensors, modules, and/or functionalities described herein.

As described herein, in some embodiments, full function RSUs or RSUs with higher levels of function are placed at or near critical points to monitor critical points, collect data from critical points, and manage vehicles at critical points. As described herein, in some embodiments, limited function RSUs are placed at non-critical points, e.g., to conserve resources, for efficient use of power and communications bandwidth, and to reduce the cost of installation of a CAVH system.

In some embodiments, the technology provides a system (e.g., a vehicle operations and control system comprising one or more of an RSU network; a TCU/TCC network; a vehicle comprising an onboard unit OBU; a TOC; and a cloud-based platform configured to provide information and computing services; see, e.g., U.S. Provisional Patent Application Ser. No. 62/691,391, incorporated herein by reference in its entirety) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network comprises an RSU and/or an RSU subsystem. In some embodiments, an RSU comprises one or more of: a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, a communication module communicates using wired or wireless media. See, e.g., U.S. patent application Ser. No. 16/135,916, incorporated herein by reference.

In some embodiments, a sensing module comprises a radar based sensor. In some embodiments, a sensing module comprises a vision based sensor. In some embodiments, a sensing module comprises a radar based sensor and a vision based sensor and wherein said vision based sensor and said radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera. See, e.g., U.S. patent application Ser. No. 16/135,916, incorporated herein by reference.

In some embodiments, the sensing module comprises a satellite based navigation system and/or is configured to receive data from a satellite based navigation system. In some embodiments, the sensing module comprises an inertial navigation system. In some embodiments, the sensing module comprises a satellite based navigation system and an inertial navigation system and wherein said sensing module comprises a satellite based navigation system and said inertial navigation system are configured to provide vehicle location data. In some embodiments, the satellite based navigation system is a Differential Global Positioning System (DGPS) or a BeiDou Navigation Satellite System (BDS) System or a GLONASS Global Navigation Satellite System. In some embodiments, the inertial navigation system comprises an inertial reference unit. See, e.g., U.S. patent application Ser. No. 16/135,916, incorporated herein by reference.

In some embodiments, the sensing module comprises a vehicle identification device. In some embodiments, the vehicle identification device is configured to receive vehicle identification data from an RFID component, Bluetooth component, Wi-fi (IEEE 802.11) component, or a cellular network radio, e.g., a 4G or 5G cellular network radio. See, e.g., U.S. patent application Ser. No. 16/135,916, incorporated herein by reference.

In some embodiments, the RSU is deployed at a fixed location near road infrastructure (e.g., near a critical point; near a non-critical point). In some embodiments, the RSU is deployed at a critical point, e.g., at a highway roadside, a highway on ramp, a highway off ramp, an interchange, a bridge, a tunnel, a toll station, or on a drone over a critical point. In some embodiments, the RSU is deployed on a mobile component. In some embodiments, the RSU is deployed on a vehicle drone or on an unmanned aerial vehicle (UAV) over a critical location (e.g., a dynamic critical point), e.g., at a site of traffic congestion, at a site of a traffic accident, at a site of highway construction, or at a site of extreme weather. In some embodiments, a RSU is positioned according to road geometry, heavy vehicle size, heavy vehicle dynamics, heavy vehicle density, and/or heavy vehicle blind zones. In some embodiments, the RSU is installed on a gantry (e.g., an overhead assembly, e.g., on which highway signs or signals are mounted). In some embodiments, the RSU is installed using a single cantilever or dual cantilever support.

In some embodiments, the TCC network is configured to provide traffic operation optimization, data processing, and data archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. patent application Ser. No. 15/628,331, filed Jun. 20, 2017, and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network is configured to provide real-time vehicle control and data processing. In some embodiments, the real-time vehicle control and data processing are automated based on preinstalled algorithms.

In some embodiments, the TCU network comprises segment TCU and/or point TCUs based on the geographical area covered by the TCU network. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. In some embodiments, the system comprises a point TCU physically combined or integrated with an RSU. In some embodiments, the system comprises a segment TCU physically combined or integrated with a RSU.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. patent application Ser. No. 15/628,331, filed Jun. 20, 2017 and United States Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network comprises: segment TCUs configured to process information from corridor and/or point TOCs and provide control targets to point TCUs; and point TCUs configured to process information from the segment TCU and RSUs and provide vehicle-based control instructions to an RSU. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. See, e.g., U.S. patent application Ser. No. 16/135,916, incorporated herein by reference.

In some embodiments, the RSU network, a RSU (e.g., a full function RSU or a limited function RSU) provides vehicles with customized traffic information and control instructions and/or receives information provided by vehicles. In some embodiments, a limited function RSU communicates information with vehicles but does not provide control instructions to vehicles. In some embodiments, a limited function RSU provides control instructions to vehicles but does not communicate information with vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, the TCU network comprises one or more TCUs comprising a sensor and control module configured to provide the sensing and control functions of an RSU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wifi radio. In some embodiments, the TCU network comprises one or more TCUs comprising a transmission and network module configured to provide communication network functions for data exchange between an automated vehicle and a RSU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RSU. In some embodiments, the management and control methods of an RSU comprise local cooperative control of vehicles and roads, system monitoring, and emergency service. In some embodiments, the TCC network comprises one or more TCCs further comprising an application module and said service management module provides data analysis for the application module. In some embodiments, the TCU network comprises one or more TCUs further comprising an application module and said service management module provides data analysis for the application module.

In some embodiments, the TOC comprises interactive interfaces. In some embodiments, the interactive interfaces provide control of said TCC network and data exchange. In some embodiments, the interactive interfaces comprise information sharing interfaces and vehicle control interfaces. In some embodiments, the information sharing interfaces comprise: an interface that shares and obtains traffic data; an interface that shares and obtains traffic incidents; an interface that shares and obtains passenger demand patterns from shared mobility systems; an interface that dynamically adjusts prices according to instructions given by said vehicle operations and control system; an interface that allows a special agency (e.g., a vehicle administrative office or police) to delete, change, and share information; and/or an interface that allows a special agency (e.g., a vehicle administrative office or police) to identify a critical point at a location on a road. In some embodiments, the vehicle control interfaces comprise: an interface that allows said vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other share mobility systems. In some embodiments, traffic incidents comprise extreme conditions, major accident, and/or a natural disaster. In some embodiments, a critical point is identified at the location of a traffic incident. In some embodiments, an interface allows the vehicle operations and control system to assume control of vehicles upon occurrence of a traffic event, extreme weather, or pavement breakdown when alerted by said vehicle operations and control system and/or other share mobility systems. In some embodiments, an interface allows vehicles to form a platoon with other vehicles when they are driving in the same dedicated and/or same non-dedicated lane.

In some embodiments, the OBU comprises a communication module configured to communicate with an RSU. In some embodiments, the OBU comprises a communication module configured to communicate with another OBU. In some embodiments, the OBU comprises a data collection module configured to collect data from external vehicle sensors and internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an RSU. In some embodiments, the OBU is configured to control a vehicle using data received from an RSU. In some embodiments, the data received from said RSU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an RSU. In some embodiments, the data sent to said RSU comprises: driver input data; driver condition data; vehicle condition data; and/or goods condition data. In some embodiments, the driver input data comprises origin of the trip, destination of the trip, expected travel time, service requests, and/or level of hazardous material. In some embodiments, the driver condition data comprises driver behaviors, fatigue level, and/or driver distractions. In some embodiments, the vehicle condition data comprises vehicle ID, vehicle type, and/or data collected by a data collection module. In some embodiments, the goods condition data comprises material type, material weight, material height, and/or material size.

In some embodiments, the OBU is configured to collecting data comprising: vehicle engine status; vehicle speed; goods status; surrounding objects detected by vehicles; and/or driver conditions. In some embodiments, the OBU is configured to assume control of a vehicle. In some embodiments, the OBU is configured to assume control of a vehicle when the automated driving system fails. In some embodiments, the OBU is configured to assume control of a vehicle when the vehicle condition and/or traffic condition prevents the automated driving system from driving said vehicle. In some embodiments, the vehicle condition and/or traffic condition is adverse weather conditions, a traffic incident, a system failure, and/or a communication failure.

The technology provides traffic sensing and control at a variety of scales, e.g., at a microscopic level (e.g., to provide traffic sensing and control for individual vehicles with respect to longitudinal movements (car following, acceleration and deceleration, stopping and standing) and lateral movements (lane keeping, lane changing)); at a mesoscopic level (e.g., to provide traffic sensing and control for road corridors and segments (e.g., special event early notification, incident prediction, weaving section merging and diverging, platoon splitting and integrating, variable speed limit prediction and reaction, segment travel time prediction, and/or segment traffic flow prediction); and at a macroscopic level (e.g., to provide traffic sensing and control for a road network (e.g., potential congestion prediction, potential incident prediction, network traffic demand prediction, network status prediction, and/or network travel time prediction). Critical points can be identified by components functioning at the microscopic, mesoscopic, and/or macroscopic levels.

As shown in FIG. 1, in some embodiments, the technology provides a CAVH system comprising a TCC/TOC 101, TCU 102, and RSU 103 to provide control for critical points. For each critical point, RSUs 103 collect static and/or dynamic data from the environment and send data to TCU 102. TCUs 102 aggregate the data and send the data (and/or fused (e.g., integrated) data) to TCC/TOC 101. Based on the data collected, TCC/TOC 101 makes decisions at the macroscopic control level and sends information and/or control instructions to TCUs 102. After receiving control instructions, TCUs 102 generate mesoscopic control strategies and send them to RSU 103. According to the strategies, RSUs 103 control vehicles at different critical points. For Stop Sign Critical Point 104, RSU 103 computes a gap between vehicles on the major road through which vehicles on the minor road may pass. For Traffic Signal Critical Point 105, RSU 103 adjusts vehicle speeds to maintain and/or control the traffic capacity of the road. For Traffic Oscillation Critical Point 106, RSU 103 controls the speed of vehicle platoons to reduce traffic saturation. For Traffic Capacity Critical Point 107, RSU 103 reroutes vehicles from the minor road to maintain the major road at a high traffic volume.

Figure 2:
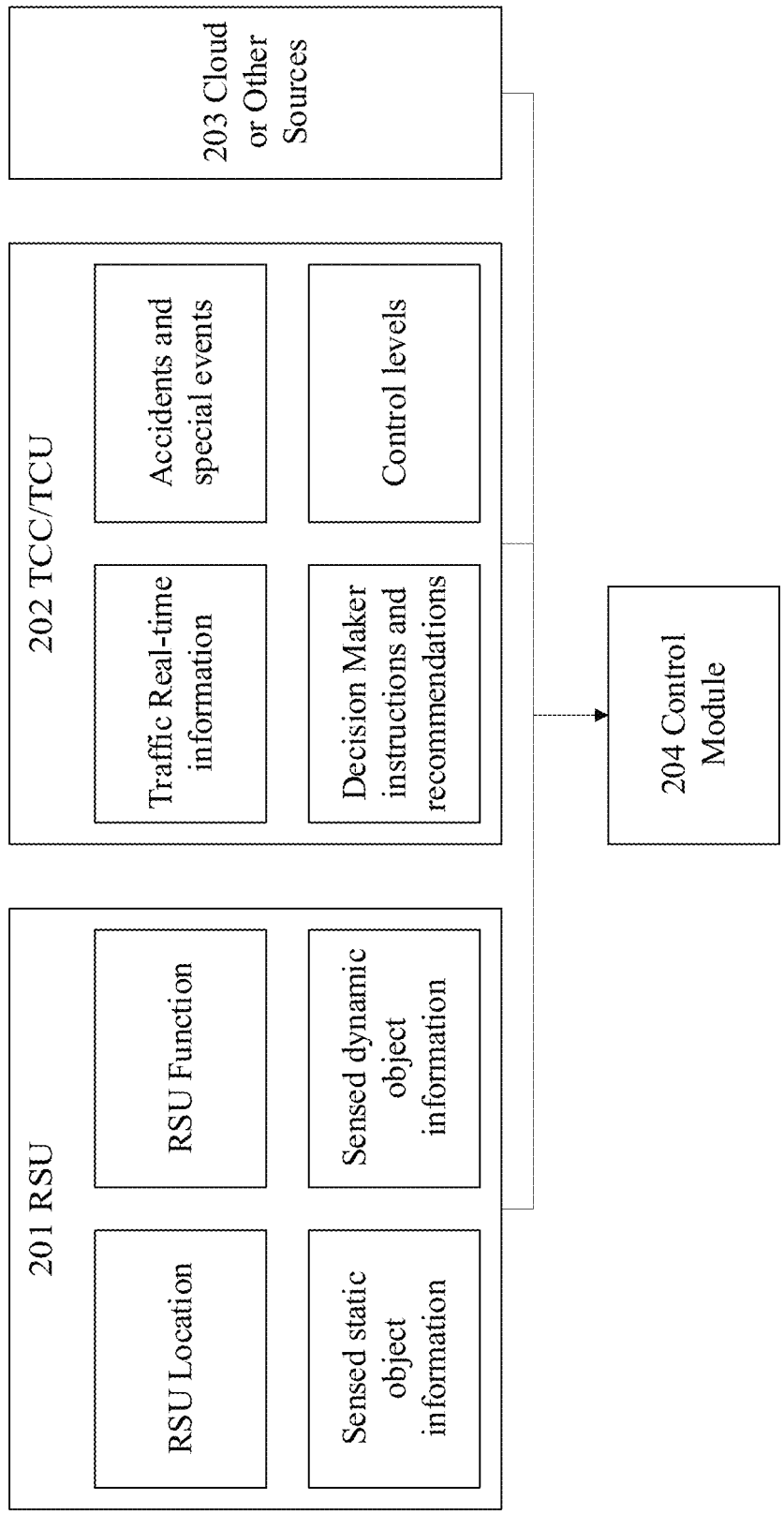
FIG. 2 is a block diagram showing an embodiment of the technology related to information flow for coordinated control of vehicles. Features of the technology shown in FIG. 2 include, e.g., an RSU 201, TCC/TCU 202, cloud or other sources 203, and a control module unit 204 (e.g., inside the RSU). The RSU is configured to receive data from connected vehicles, detect traffic conditions, and send targeted instructions to vehicles. RSU receives a control strategy from TCU and sends instructions to local vehicles based on the strategy.

As shown in FIG. 2, in some embodiments, the technology comprises components configured to manage information flow for coordinated control of vehicles. RSU 201 provides location information and function requirements to control module 204 along with sensed static object information and sensed dynamic object information (e.g., data from sensors characterizing and/or identifying moving objects in the environment (e.g., dynamic objects) and non-moving objects in the environment (e.g., static objects). TCC/TCU 202 conveys real-time traffic information, accidents and special events information, instructions and recommendations from decision-makers, and control levels to control module 204 to facilitate control process. Control module 204 also receives information from the cloud and other sources 203 for calculating control strategies and/or to provide control instructions.

Figure 3:
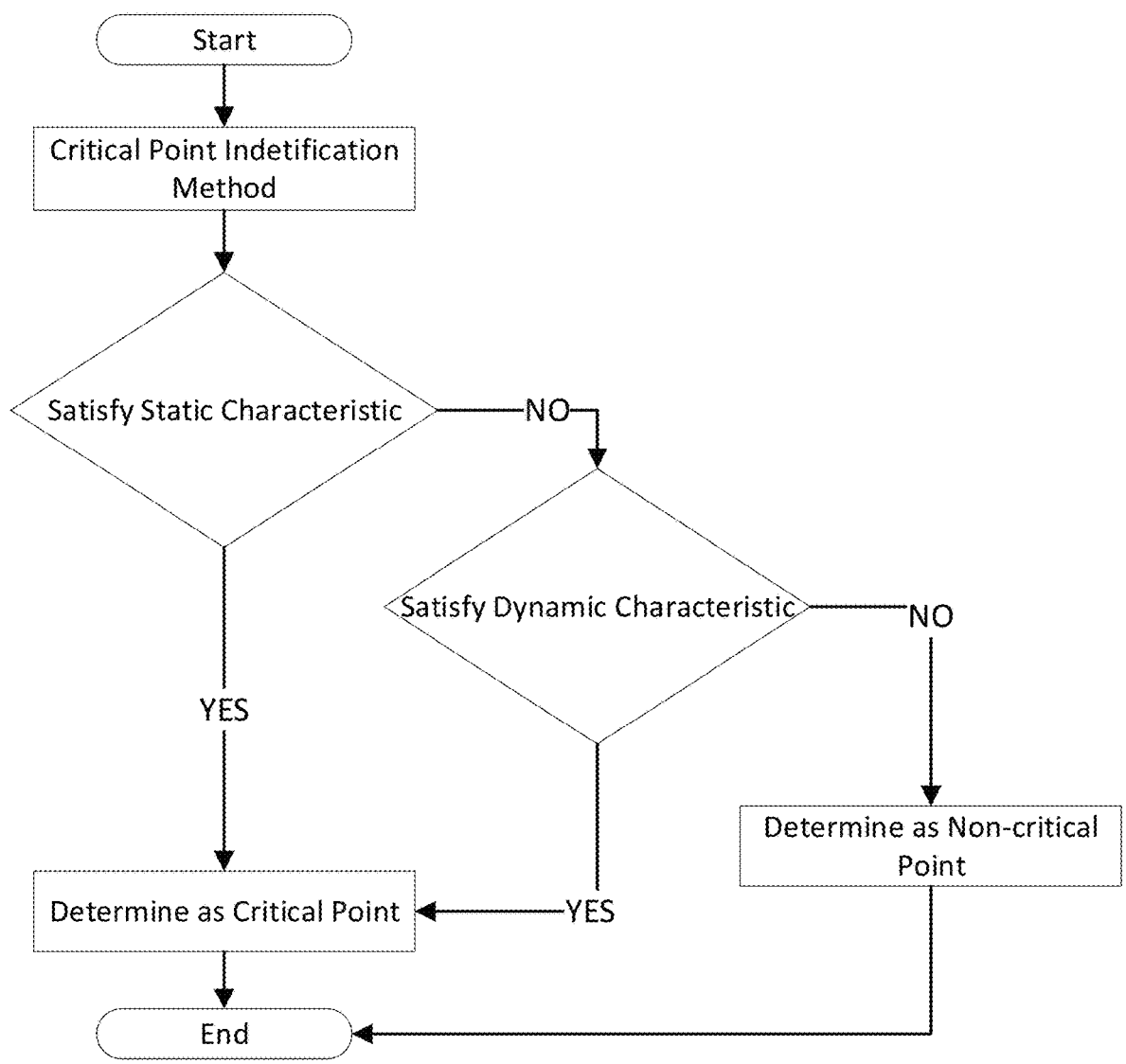
FIG. 3 is a flowchart of an exemplary method embodiment of the technology. The exemplary method identifies critical points on roads, e.g., by identifying dynamic and static characteristics of vehicles (e.g., automated and non-automated vehicles) and other entities (e.g., people, objects) using a road or near a road.

As shown in FIG. 3, in some embodiments, the technology comprises components configured to identify critical points in a road system. For example, embodiments provide that the system compares information and/or sensor data characterizing a location on a road to determine if the location satisfies the criteria for a static critical point (e.g., historical crash data, traffic sign, traffic signal, road configuration, etc.). If the location satisfies the criteria for a static critical point, the location is identified as a critical point. If the location does not satisfy the criteria for a static critical point, the system compares information and/or sensor data characterizing the location to determine if the location satisfies the criteria for a dynamic critical point (traffic oscillations, real-time traffic incident, etc.). If the location satisfies the criteria for a dynamic critical point, the location is identified as a critical point. If the location does not satisfy the criteria for a dynamic critical point, the location will be identified as a non-critical point.

Figure 4:
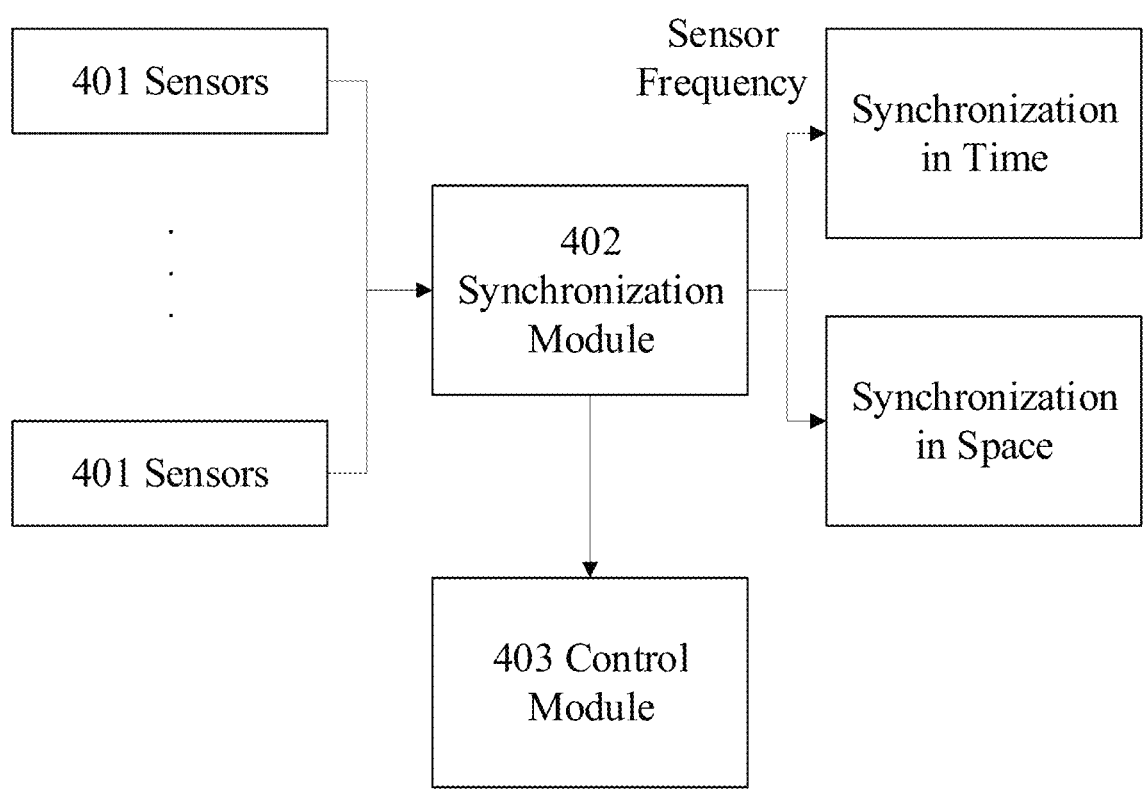
FIG. 4 is a block diagram showing an embodiment of the technology for synchronizing sensor data in space and/or in time. Features of the technology shown in FIG. 4 include, e.g., one or more Sensors 401 (e.g., devices that sense the environment and/or surroundings); a Synchronization module 402 (e.g., a unit inside a TCC/TCU or RSU) that synchronizes data from sensors in time and/or in space; and a Control module 403 (e.g., a Control unit inside RSU). Data synchronization in time refers to identifying first data from a first sensor and second data from a second sensor occurred at the same time (or at substantially or effectively the same time). Data synchronization in space refers to identifying first data from a first sensor and second data from a second sensor occurred at the same location (or at substantially or effectively the same location).

As shown in FIG. 4, in some embodiments, the technology comprises a component configured to synchronize sensor data. The synchronization module 402 receives sensor data from sensors 401 and synchronizes these data in time and/or synchronizes these data with respect to location (e.g., space synchronization). Synchronized data are provided to control module 403 for use in controlling vehicles in the system. In some embodiments, sensor frequency is used to synchronize sensor data in time.

Figure 5:
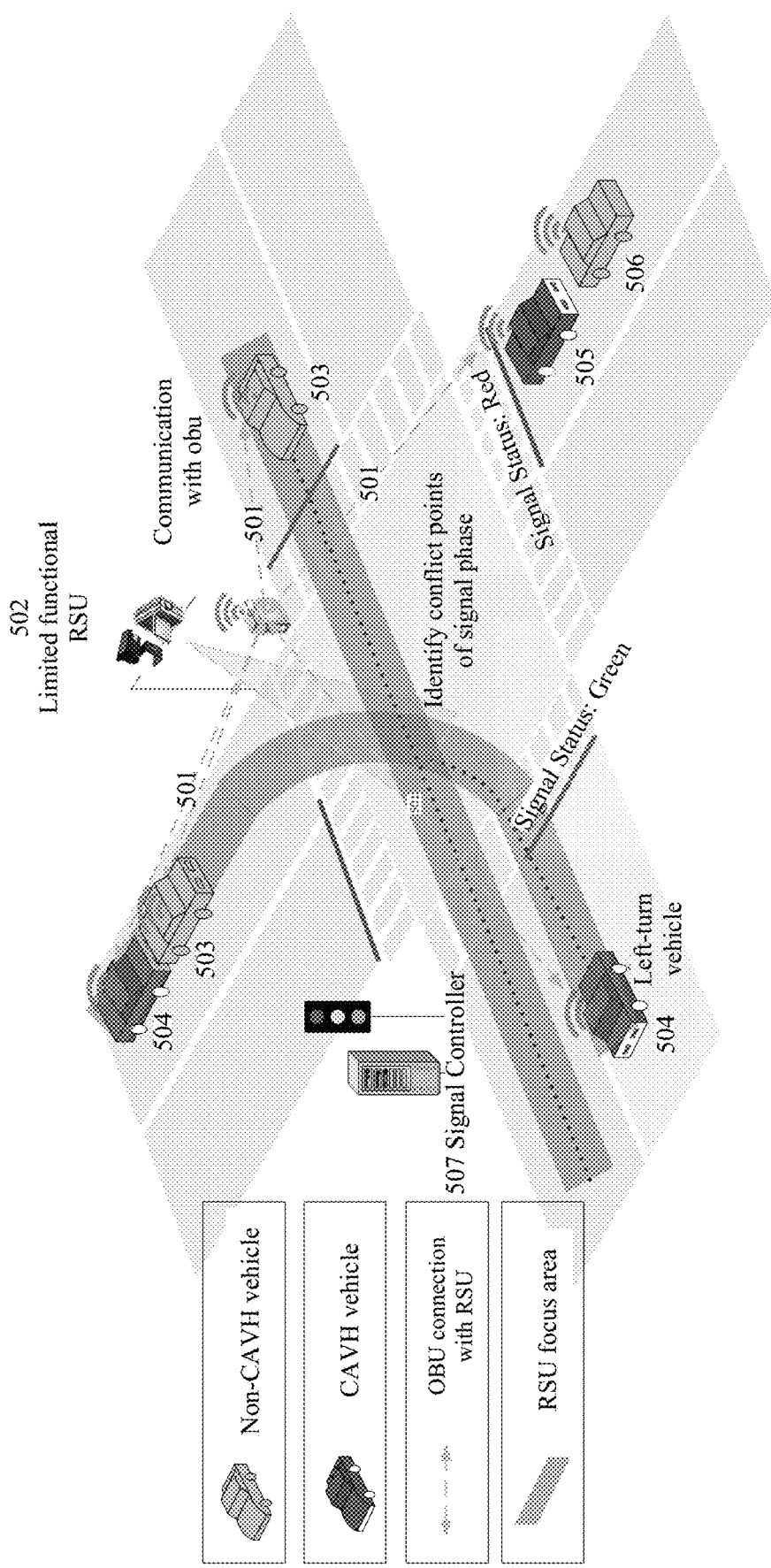
FIG. 5 is a schematic drawing showing an embodiment of the technology at a traffic signal critical point. Features of the technology shown in FIG. 5 include, e.g., Communication between vehicles and RSU 501; Limited function RSU 502; Non-CAVH vehicle identified to have critical movement 503; CAVH vehicle identified to have critical movement 504; Non-CAVH vehicle identified to have non-critical movement 505; CAVH vehicle identified to have non-critical movement 506; and a Signal Controller 507.

As shown in FIG. 5, in some embodiments, the technology provides systems and methods for managing traffic at an intersection comprising a traffic signal. In some embodiments, systems comprise a limited function RSU 502 at a signalized intersection with permitted left-turn phases. During each signal phase, there are potential conflict points between vehicles moving through the intersection. For example, vehicles turning left and oncoming vehicles moving straight through the intersection (FIG. 5, shaded trajectories) would have a conflict point during this phase. In some embodiments, the limited function RSU 502 coordinates with the signal controller 507 to pre-identify conflict points at an intersection. When a first vehicle 503 and a second vehicle 504 approach the intersection with critical movements, the RSU 502 communicates with those vehicles (e.g., by wireless communication 501) and provides the vehicles with information and control instructions to guide the vehicles through the intersection safely and efficiently. For example, in some embodiments, the system sends a starting time to non-CAVH vehicles approaching the intersection with critical movements (e.g., vehicle 503) and sends a control strategy to the CAVH vehicles approaching the intersection with critical movements (e.g., vehicle 504). Meanwhile, the limited function RSU would not communicate with and/or provide instructions to vehicles approaching the intersection with non-critical movements (e.g., vehicles 505 and 506) to preserve resources for providing instructions to vehicles approaching the intersection with critical movements.

Figure 6:
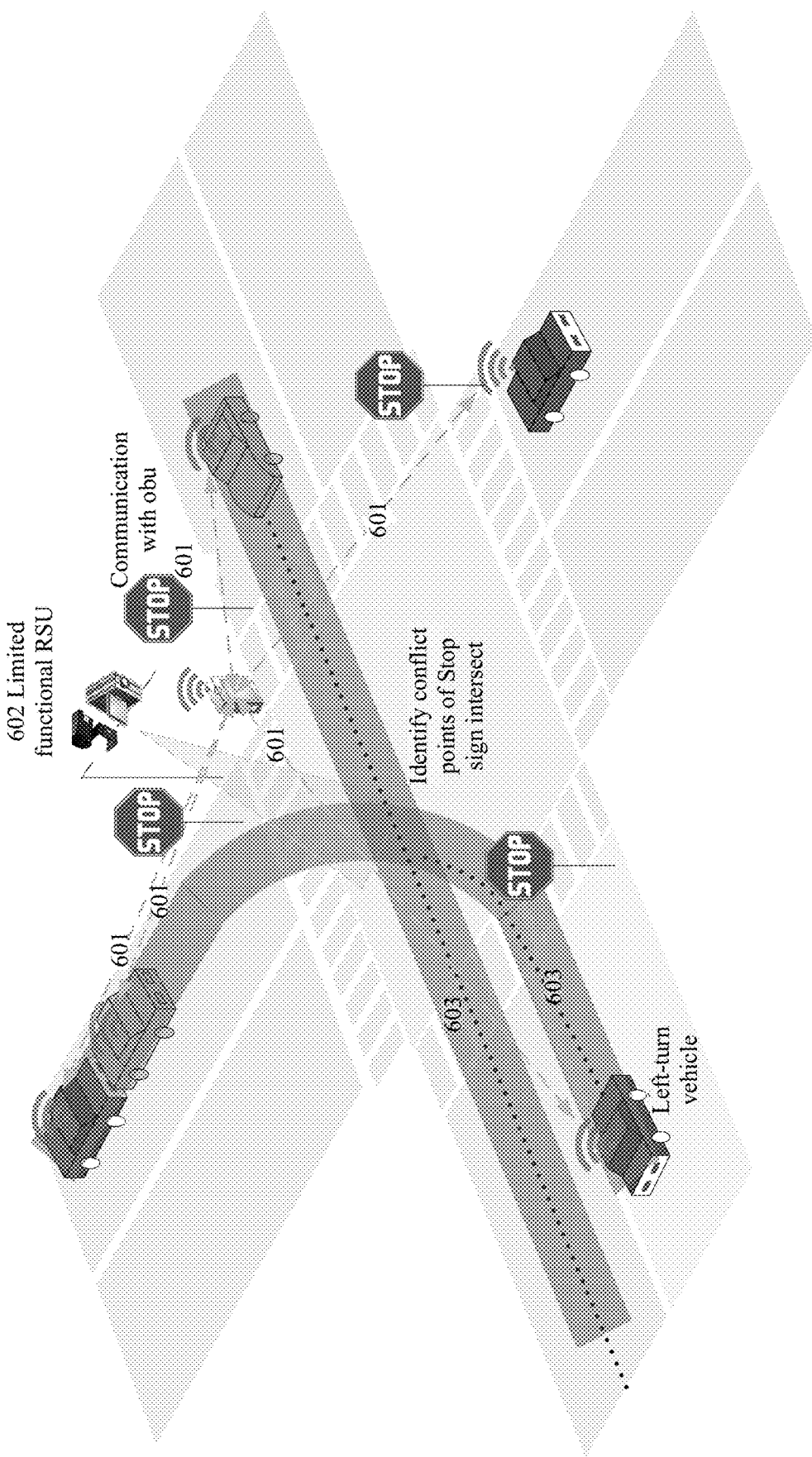
FIG. 6 is a schematic drawing showing an embodiment of the technology at a stop sign critical point. Features of the technology shown in FIG. 6 include, e.g., Communication (e.g., wireless communication) between RSU and vehicles 601; Limited function RSU 602; and vehicle travel trajectory 603.

As shown in FIG. 6, in some embodiments the technology provides systems and methods for managing traffic at an intersection comprising a stop sign (e.g., a 4-way stop intersection). In some embodiments, systems comprise a limited function RSU 602 at a 4 way stop sign intersection. The vehicle trajectories 603 cause conflict points in the stop sign intersection. The limited function RSU 602 identifies conflict points in the stop sign intersection. Then the RSU communicates with the nearby vehicles (e.g., by wireless communication 601) and provides information and/or control instructions to the nearby vehicles to guide the vehicles through the stop sign intersection.

Figure 7:
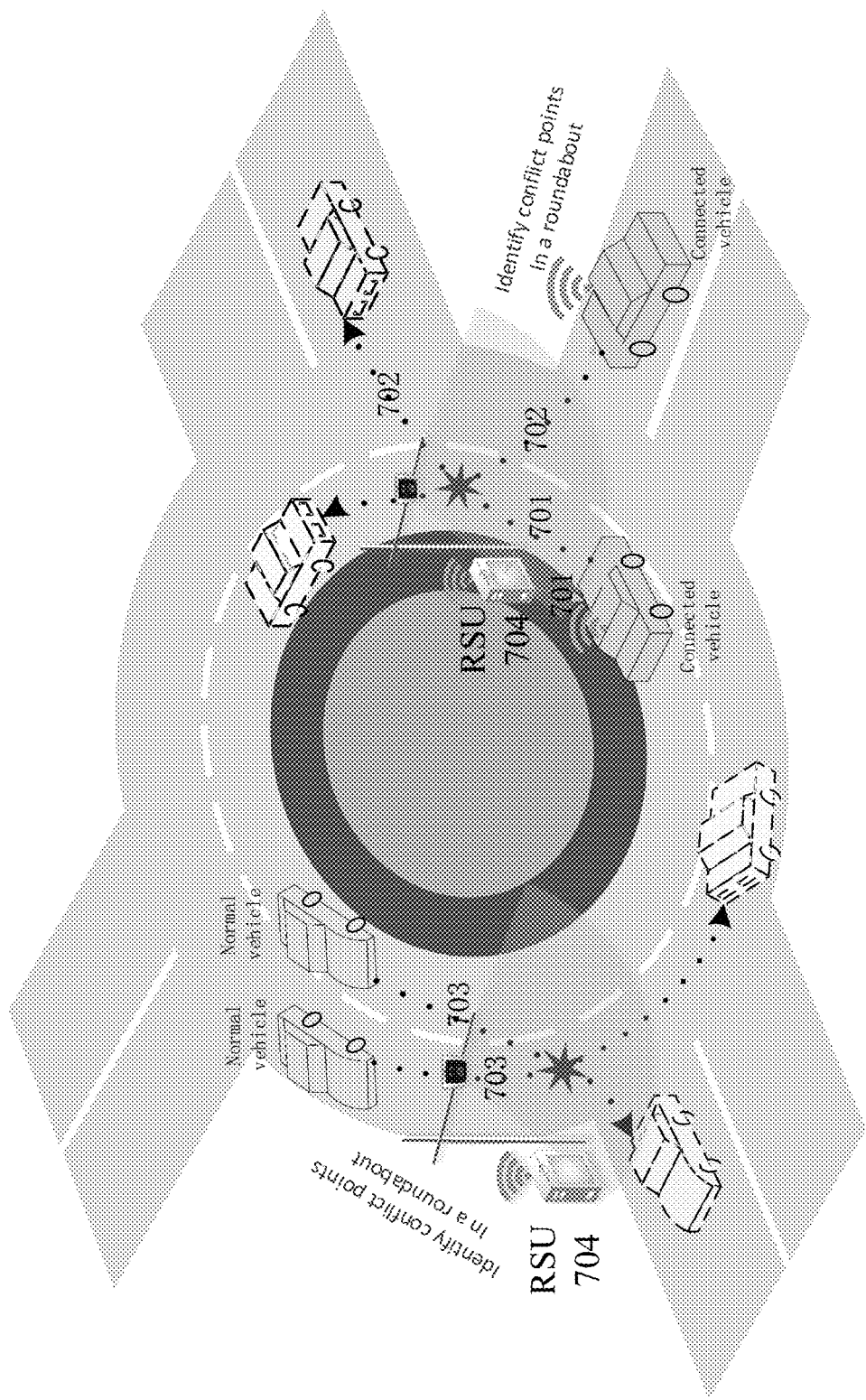
FIG. 7 is a schematic drawing showing an embodiment of the technology at a roundabout critical point. Features of the technology shown in FIG. 7 include, e.g., Communication (e.g., wireless communication) among CAVH components and connected vehicles 701; trajectory for connected vehicles 702; trajectories for normal vehicles 703; and an RSU 704.

As shown in FIG. 7, in some embodiments, the technology provides systems and methods for managing traffic at a roundabout. Vehicle trajectories of vehicles in the roundabout, approaching the roundabout, and exiting the roundabout (e.g., vehicles 702 and 703) potentially cause conflict points in the roundabout. One or more RSUs 704 are positioned near conflict points of a roundabout. The RSUs 704 identify and sense the areas near the conflict point. Then, the RSU sends information about the conflicted areas to the nearby connected vehicles (e.g., by wireless communication 701) and helps those connected vehicles travel through the roundabout.

The technology provides systems and methods for managing traffic and controlling vehicles on roadway systems. In particular, the technology provides systems, components of systems, and methods for managing traffic and controlling vehicles on a variety of road types, on roadway systems comprising a variety of different road types (e.g., for managing traffic and controlling vehicles that move among various road types). For example, embodiments of the technology relate to managing traffic and controlling vehicles on roads having a range of traffic volumes (e.g., high volume, low volume, moderate volume, varying volume), a range of vehicle and traffic types (e.g., autonomous, non-autonomous, pedestrian, heavy vehicle, platoon, bicycle, etc.), different road components (e.g., intersections, curves, straight portions, on-ramps, off-ramps, roundabouts, etc.), different traffic control components (e.g., traffic signals, stop signs, special traffic lanes, etc.), and for roads having critical points and for roads that do not have critical points. In some embodiments, the technology comprises providing different types of RSUs (e.g., comprising different sensors and/or different numbers of sensors) for different types of roads. For example, in some embodiments, regions of roads comprising a critical point comprise RSUs with a higher level of functionality (e.g., RSUs provide both traffic control and information services, RSUs comprise a larger number of sensors, etc.) to provide increased monitoring, increased data collection, increased information provision, and increased control of traffic. In some embodiments, regions of roads comprising a critical point comprise an increased number of RSUs to provide more coverage by the CAVH system of the critical point area. In some embodiments, regions of roads that do not comprise a critical point comprise RSUs of lower functionality and/or a decreased number of RSUs, e.g., to conserve resources and/or to allocate resources to areas comprising a critical point or requiring more traffic management and vehicle control.

In some embodiments, the technology provides methods and systems to manage traffic and control vehicles in particular scenarios. For example, in some embodiments, the technology provides methods and systems to manage traffic (e.g., mixed traffic) and control vehicles at a signalized intersection. In some embodiments, the technology provides methods comprising collecting information (e.g., by CAVH sensors (e.g., by RSU sensors and/or by vehicle sensors)) at a signalized intersection. In some embodiments, the technology provides systems configured to collect information (e.g., by CAVH sensors (e.g., by RSU sensors and/or by vehicle sensors)) at a signalized intersection. In some embodiments, technology for information collection and sensing at a signalized intersection comprises an intersection RSU that collects information and data from communicating with vehicles within range of the intersection, upper level IRIS servers (e.g., TCU/TCC), and the regional traffic signal system. Furthermore, the intersection RSU comprises sensing devices and acquires data through the sensing devices. In some embodiments, the technology provides methods comprising predicting and/or managing transportation behavior (e.g., predicting traffic patterns and vehicle trajectories), making decisions on traffic management and vehicle control strategies and instructions, and choosing algorithms and models for prediction and making decisions at a signalized intersection. In some embodiments, the technology provides systems configured to predict and/or manage transportation behavior (e.g., predict traffic patterns and vehicle trajectories), make decisions on traffic management and vehicle control strategies and instructions, and choose algorithms and models for prediction and making decisions at a signalized intersection. In some embodiments, technology for prediction and decision making at a signalized intersection assesses collected (e.g., aggregated and/or integrated) information (e.g., historical data, real-time data provided by CAVH system (e.g., data provided by RSUs, data provided by vehicles, data provided by upper level IRIS servers (e.g., TCU/TCC)), chooses an algorithm and/or model, and provides traffic management and/or vehicle control instructions (e.g., optimized for the traffic scenario) for the vehicles within range of the signalized intersection. In some embodiments, methods comprise controlling and/or distributing information relating to a signalized intersection. In some embodiments, systems are configured to control and/or distribute information relating to a signalized intersection. In some embodiments, technology for control and/or distribution of information relating to a signalized intersection comprises sending control messages to vehicles configured to follow automation orders (e.g., vehicles comprising an OBU). In some embodiments, other vehicles with V2I capabilities receive relevant traffic information and/or driving instructions. In some embodiments, mesoscopic (e.g., platoon control and organization; coordinating traffic with traffic signals at the intersection) and microscopic level control for individual vehicle (e.g., steering, braking, and/or acceleration instructions; and/or longitude and latitude parameters to follow) are implemented.

As described herein, the CAVH technology provides that critical points (e.g., road areas where vehicles from different directions may conflict (e.g., at a signalized intersection)) comprise an increased deployment of sensing devices (e.g., increased number of RSUs and/or RSUs comprising an increased number of sensors). The locations of vehicle conflict at a critical point vary in time and/or in location. In particular, the locations and times of vehicle conflict are a function of vehicle movements, the traffic signal control, and/or the design of the intersection and signalization of the intersection. Accordingly, these factors are provided as information to implement the types and number of sensing devices (e.g., RSUs) at signalized intersections.

Furthermore, in some embodiments, the technology provides methods and systems to manage traffic (e.g., mixed traffic) and control vehicles travelling on a freeway. In some embodiments, the technology provides methods comprising collecting information (e.g., by CAVH sensors (e.g., by RSU sensors and/or by vehicle sensors)) on a freeway. In some embodiments, the technology provides systems configured to collect information (e.g., by CAVH sensors (e.g., by RSU sensors and/or by vehicle sensors)) on a freeway. In some embodiments, technology for information collection and sensing on a freeway comprises a freeway RSU that collects information and data from communicating with vehicles within range of the freeway section, upper level IRIS servers (e.g., TCU/TCC), and the regional traffic signal system. Furthermore, the freeway RSU comprises sensing devices and acquires data through the sensing devices. For example, in some embodiments, the RSU senses the road conditions and/or the composition of the mixed traffic stream on the freeway (e.g., numbers and types (e.g., distribution) of vehicles (e.g., autonomous, non-autonomous, heavy, platooned, etc.)) In some embodiments, the technology provides methods comprising predicting and/or managing transportation behavior (e.g., predicting traffic patterns and vehicle trajectories), making decisions on traffic management and vehicle control strategies and instructions, and choosing algorithms and models for prediction and making decisions for vehicles on a freeway. In some embodiments, the technology provides systems configured to predict and/or manage transportation behavior (e.g., predict traffic patterns and vehicle trajectories), make decisions on traffic management and vehicle control strategies and instructions, and choose algorithms and models for prediction and making decisions for vehicles on a freeway. In some embodiments, technology for prediction and decision making on a freeway assesses collected (e.g., aggregated and/or integrated) information (e.g., historical data, real-time data provided by CAVH system (e.g., data provided by RSUs, data provided by vehicles, data provided by upper level IRIS servers (e.g., TCU/TCC)), chooses an algorithm and/or model, and provides traffic management and/or vehicle control instructions (e.g., optimized for the traffic scenario) for the vehicles within range of the freeway section. In some embodiments, methods comprise controlling and/or distributing information relating to a freeway. In some embodiments, systems are configured to control and/or distribute information relating to a freeway. In some embodiments, technology for control and/or distribution of information relating to a freeway comprises sending control messages (e.g., from a TCC/TCU) to vehicles configured to follow automation orders (e.g., vehicles comprising an OBU). In some embodiments, other vehicles with V2I capabilities receive relevant traffic information (e.g., real-time traffic information) and/or driving instructions for the freeway section. In some embodiments, mesoscopic (e.g., platoon control and organization) and microscopic level control for individual vehicle (e.g., steering, braking, and/or acceleration instructions; and/or longitude and latitude parameters to follow) are implemented.

In some embodiments, the technology provides methods and systems to manage traffic (e.g., mixed traffic) and control vehicles at a stop sign or yield sign intersection. In some embodiments, the technology provides methods comprising collecting information (e.g., by CAVH sensors (e.g., by RSU sensors and/or by vehicle sensors)) at a stop sign or yield sign intersection (e.g., by RSU near the stop sign or yield sign). In some embodiments, the technology provides systems configured to collect information (e.g., by CAVH sensors (e.g., by RSU sensors and/or by vehicle sensors)) at a stop sign or yield sign intersection (e.g., by RSU near the stop sign or yield sign). Furthermore, the intersection RSU comprises sensing devices and acquires data through the sensing devices. In some embodiments, technology for information collection and sensing at a stop sign or yield sign intersection comprises an intersection RSU that collects information and data from communicating with vehicles within range of the intersection, upper level IRIS servers (e.g., TCU/TCC), the regional traffic signal system, and sensing the intersection area near the stop sign or yield sign for data and information using RSU sensors and/or sensors on a vehicle. In some embodiments, the technology provides methods comprising predicting and/or managing transportation behavior (e.g., predicting traffic patterns and vehicle trajectories), making decisions on traffic management and vehicle control strategies and instructions, and choosing algorithms and models for prediction and making decisions at a stop sign or yield sign intersection to manage traffic flow through the stop sign or yield sign intersection. In some embodiments, the technology provides systems configured to predict and/or manage transportation behavior (e.g., predict traffic patterns and vehicle trajectories), make decisions on traffic management and vehicle control strategies and instructions, and choose algorithms and models for prediction and making decisions at a stop sign or yield sign intersection to manage traffic flow through the stop sign or yield sign intersection. In some embodiments, technology for prediction and decision making at a signalized intersection assesses collected (e.g., aggregated and/or integrated) information (e.g., historical data, real-time data provided by CAVH system (e.g., data provided by RSUs, data provided by vehicles, data provided by upper level IRIS servers (e.g., TCU/TCC)), chooses an algorithm and/or model, and provides traffic management and/or vehicle control instructions (e.g., optimized for the traffic scenario) for the vehicles within range of the stop sign or yield sign intersection. In some embodiments, methods comprise controlling and/or distributing information relating to a stop sign or yield sign intersection. In some embodiments, systems are configured to control and/or distribute information relating to a stop sign or yield sign intersection. In some embodiments, technology for control and/or distribution of information relating to a stop sign or yield sign intersection comprises sending control messages to vehicles configured to follow automation orders (e.g., vehicles comprising an OBU). In some embodiments, other vehicles with V2I capabilities receive relevant traffic information and/or driving instructions. In some embodiments, mesoscopic (e.g., vehicle movement and organization; platoon control; coordinating traffic movement with movement of pedestrians crossing roads at the stop sign or yield sign intersection) and microscopic level control for individual vehicle (e.g., steering, braking, and/or acceleration instructions; and/or longitude and latitude parameters to follow) are implemented.

In some embodiments, the technology provides methods and systems to manage traffic and control vehicles at a roundabout (e.g., entering into, exiting from, and/or traveling within a roundabout). For example, in some embodiments, the technology provides methods and systems to manage traffic (e.g., mixed traffic) and control vehicles at a roundabout. In some embodiments, the technology provides methods comprising collecting information (e.g., by CAVH sensors (e.g., by RSU sensors and/or by vehicle sensors)) at a roundabout. In some embodiments, the technology provides systems configured to collect information (e.g., by CAVH sensors (e.g., by RSU sensors and/or by vehicle sensors)) at a roundabout. In some embodiments, technology for information collection and sensing at a signalized intersection comprises a roundabout RSU (e.g., a plurality of roundabout RSUs) that collects information and data from communicating with vehicles at the roundabout, upper level IRIS servers (e.g., TCU/TCC), and sensing the areas near the roundabout (e.g., by RSU sensors or vehicle onboard sensors). Accordingly, in some embodiments, a roundabout RSU comprises sensing devices and acquires data through the sensing devices. In some embodiments, the technology provides methods comprising predicting and/or managing transportation behavior (e.g., predicting traffic patterns and vehicle trajectories), making decisions on traffic management and vehicle control strategies and instructions, and choosing algorithms and models for prediction and making decisions at a roundabout. In some embodiments, the technology provides systems configured to predict and/or manage transportation behavior (e.g., predict traffic patterns and vehicle trajectories), make decisions on traffic management and vehicle control strategies and instructions, and choose algorithms and models for prediction and making decisions at a roundabout. In some embodiments, technology for prediction and decision making at a roundabout assesses collected (e.g., aggregated and/or integrated) information (e.g., historical data, real-time data provided by CAVH system (e.g., data provided by RSUs, data provided by vehicles, data provided by upper level IRIS servers (e.g., TCU/TCC)), chooses an algorithm and/or model, and provides traffic management and/or vehicle control instructions (e.g., optimized for the traffic scenario) for the vehicles at the roundabout. In some embodiments, methods comprise controlling and/or distributing information relating to a signalized intersection. In some embodiments, systems are configured to control and/or distribute information relating to a roundabout. In some embodiments, technology for control and/or distribution of information relating to a roundabout comprises sending control messages to vehicles configured to follow automation orders (e.g., vehicles comprising an OBU). In some embodiments, other vehicles with V2I capabilities receive relevant traffic information and/or driving instructions. In some embodiments, mesoscopic (e.g., platoon control and organization; coordination of roundabout traffic with traffic signals) and microscopic level control for individual vehicle (e.g., steering, braking, and/or acceleration instructions; and/or longitude and latitude parameters to follow) are implemented.

As described herein, the CAVH technology provides that critical points (e.g., road areas where vehicles from different directions may conflict (e.g., at a roundabout)) comprise an increased deployment of sensing devices (e.g., increased number of RSUs and/or RSUs comprising an increased number of sensors). The locations of vehicle conflict at a critical point vary in time and/or in location. In particular, the locations and times of vehicle conflict are a function of vehicle movements, the traffic signal control, and/or the design of the roundabout and signalization of the roundabout. Accordingly, these factors are provided as information to implement the types and number of sensing devices (e.g., RSUs) at a roundabout. As a particular example, there are 8 total conflict points at a typical 4-leg roundabout-4 merging and 4 diverging.

We claim:

1. An autonomous vehicle (AV) control system for critical points with a partially instrumented connected automated vehicle highway (CAVH) system, comprising:
   an onboard unit (OBU); and
   a communication module configured to:
      communicate with one or more at least partially instrumented roadside units (RSUs) forming a partially instrumented RSU network and receive vehicle-specific control instructions from said one or more RSUs corresponding to critical points; or
      communicate with a cloud platform serving a partially instrumented CAVH system and receive vehicle-specific control instructions from said cloud platform corresponding to the critical points;
      wherein, the AV control system provides time-sensitive control instructions for controlling vehicles, and a vehicle comprising the OBU executes time-sensitive control instructions for driving tasks.

2. The AV control system of claim 1, wherein at least one of the critical points is identified as a region or point of a road having a characteristic selected from the group consisting of: high traffic control and management priority, a high historical crash frequency, traffic control signage, a traffic control sign, traffic congestion, a critical road geometry, a traffic oscillation, and a real-time traffic incident.

3. The AV control system of claim 1, wherein one or more critical points are instrumented with one or more RSUs or a cloud platform to provide partial or full control of the critical point.

4. The AV control system of claim 1, wherein said partially instrumented RSU network provides individual vehicles with vehicle-specific information.

5. The AV control system of claim 4, wherein said vehicle-specific information comprises at least one type of information selected from a group consisting of: weather information, pavement conditions, estimated travel time, and the time-sensitive control instructions.

6. The AV control system of claim 1, wherein said RSU are configured to provide real-time vehicle environment sensing and traffic behavior prediction, and send instantaneous control instructions for individual vehicles through the communication module.

7. The AV control system of claim 1, wherein said time-sensitive control instructions comprise instructions for vehicle longitudinal and lateral position; speed; and steering and control.

8. The AV control system of claim 1, wherein said cloud-based platform is configured to provide information and computing services.

9. The AV control system of claim 1, wherein the cloud-based platform provides individual vehicles with vehicle-specific information selected from a group consisting of: weather information, pavement conditions, and estimated travel time; or the time-sensitive control instructions.

10. The AV control system of claim 1, wherein the cloud-based platform is configured to provide a service selected from the group consisting of: storage as a service (STaaS), control as a service (CCaaS), computing as a service (CaaS), and/or sensing as a service (SEaaS).

11. An autonomous vehicle (AV) and cloud control system for critical points with a partially instrumented connected automated vehicle highway (CAVH) system, comprising:
    an onboard unit (OBU); and
    a cloud platform configured to serve a partially instrumented CAVH system and provide vehicle-specific control instructions for critical points;
    wherein, the AV control system provides time-sensitive control instructions for controlling vehicles, and a vehicle comprising the OBU executes time-sensitive control instructions for driving tasks.

12. The AV and cloud control system of claim 11, wherein at least one of the critical points is identified as a region or point of a road having at least one of the following characteristics selected from the group consisting of: high traffic control and management priority, a high historical crash frequency, traffic control signage, a traffic control sign, traffic congestion, a critical road geometry, a traffic oscillation, and a real-time traffic incident.

13. The AV and cloud control system of claim 11, wherein at least one of the critical points comprises a curve, hill, blind spot, merge point, on ramp, off ramp, toll, or traffic circle.

14. The AV and cloud control system of claim 11, wherein one or more critical points are instrumented with a cloud platform or one or more RSUs to provide partial or full control of the critical point.

15. The AV and cloud control system of claim 11, wherein said partially instrumented CAVH system provides individual vehicles with vehicle-specific information selected from a group consisting of: weather information, pavement conditions, and estimated travel time; or the time-sensitive control instructions.

16. The AV and cloud control system of claim 11, wherein said time-sensitive control instructions comprise instructions for vehicle longitudinal and lateral position; speed; and steering and control.

17. The AV and cloud control system of claim 11, wherein said cloud-based platform is configured to provide information and computing services.

18. The AV and cloud control system of claim 11, configured to choose algorithms and models for prediction and making decisions at a signalized intersection, a freeway section, a stop sign, a yield sign, and/or a roundabout.

19. The AV and cloud control system of claim 11, wherein the system is configured to take proactive measures based on incident prediction and risk index estimation, before a traffic incident occurs; or active methods based on rapid incident detection to identify imminent incidents.

20. The AV and cloud control system of claim 11, wherein the cloud-based platform is configured to provide a service selected from the group consisting of: storage as a service (STaaS), control as a service (CCaaS), computing as a service (CaaS), and sensing as a service (SEaaS).

* * * * *